(12) United States Patent
Knox et al.

(10) Patent No.: US 7,403,688 B2
(45) Date of Patent: Jul. 22, 2008

(54) METHOD AND OPTICAL FIBER DEVICE FOR PRODUCTION OF LOW NOISE CONTINUUM

(75) Inventors: Wayne H. Knox, Pittsford, NY (US); Fei Lu, Rochester, NY (US)

(73) Assignee: University of Rochester, Rochester, NY (US)

(*) Notice: Subject to any disclaimer, the term of this patent is extended or adjusted under 35 U.S.C. 154(b) by 0 days.

(21) Appl. No.: 11/300,593

(22) Filed: Dec. 15, 2005

(65) Prior Publication Data

US 2006/0159398 A1 Jul. 20, 2006

Related U.S. Application Data

(60) Provisional application No. 60/636,101, filed on Dec. 16, 2004.

(51) Int. Cl.
*G02B 6/00* (2006.01)
(52) U.S. Cl. ........................ 385/122; 385/125
(58) Field of Classification Search .......... 385/125, 385/122, 123
See application file for complete search history.

(56) References Cited

U.S. PATENT DOCUMENTS

2005/0094941 A1 5/2005 Knox

2006/0153512 A1* 7/2006 Falkenstein et al. ......... 385/125

OTHER PUBLICATIONS

Birks et al., Supercontinuum Generation in Tapered Fibers, Oct. 1, 2000, vol. 25, No. 19, Optics Letters, pp. 1415-1417.*
Sakamaki et al., Soliton Induced Supercontinuum Generation in Photonic Crystal Fiber, Sep./Oct. 2004, vol. 10, No. 5, IEEE Journal of Selected Topics in Quantum Electronics, pp. 876-884.*
Skryabin et al., Soliton Self Frequency Shift Cancellation in Photonic Crystal Fibers, Sep. 19, 2003, vol. 301, Science,☐☐ pp. 1705-1708.*
Skryabin et al., Soliton Self Frequency Shift Cancellation in Photonic Crystal Fibers, Sep. 19, 2003, vol. 301, Science, pp. 1705-1708.*
"Generation of a broadband continuum with high spectral coherence in tapered single-mode optical fibers", Fei Lu, et al., Optics Express, Jan. 26, 2004, vol. 2, No. 2, pp. 347-353.

* cited by examiner

*Primary Examiner*—Frank G Font
*Assistant Examiner*—Guy G Anderson
(74) *Attorney, Agent, or Firm*—Blank Rome LLP

(57) ABSTRACT

A waveguide, such as a holey fiber or other optical fiber, is tapered to control the dispersion in a manner which varies along the length of the tapered portion of the fiber, thus providing the desired characteristics of the fiber. The longitudinal variation of the phase-matching conditions for Cherenkov radiation (CR) and four-wave mixing (FWM) introduced by DMM allow the generation of low-noise supercontinuum. The flexibility of the design permits the designer to control the tapering to select the bandwidth, the center frequency, or both. The holey fiber can be a polarization-maintaining fiber.

30 Claims, 8 Drawing Sheets

(e)

METHOD AND OPTICAL FIBER DEVICE FOR PRODUCTION OF LOW NOISE CONTINUUM

REFERENCE TO RELATED APPLICATION

The present application claims the benefit of U.S. Provisional Patent Application No. 60/636,101, filed Dec. 16, 2004, whose disclosure is hereby incorporated by reference in its entirety into the present disclosure.

DESCRIPTION OF RELATED ART

Kilometer-scale dispersion management plays a key role in fiber-based telecommunications systems, and meter-scale dispersion management is used in mode-locked fiber lasers. Recently, holey fibers (HF) have been shown to generate octave bandwidth supercontinuum, with experiments and theories showing that the dispersion is a critical parameter that can affect the continuum output (soliton part and anti-Stokes part) significantly. For those highly nonlinear processes, the nonlinear phase can be as large as $\pi$ within only mm propagation length. Therefore, it is very important to manage the fiber dispersion on the sub-mm scale.

Through photonic crystal fibers (PCF) and tapered fibers, supercontinuum (SC) has been successfully generated directly using laser oscillators. That spectrally broad continuum source is potentially useful in many applications, such as optical coherence tomography (OCT), optical frequency metrology, fluorescent microscopy, coherent anti-Stokes Raman scattering (CARS) microscopy and two photon fluorescence microscopy. Unfortunately, for those experiments, the large amplitude fluctuations of conventional continuum sources limit accuracy. Previous studies of SC generation have shown that the SC generation process is very sensitive to the quantum noise, technical noise, and specific parameters such as the input wavelength, time duration and chirp of the input laser pulses. A light source derived from a stable continuum would be required to improve experimental results.

A common approach to wavelength conversion is to generate a white light continuum, then spectrally slice part of the continuum and use it as the light source for the microscopy setup. However, the selected continuum likely contains large amplitude fluctuations (noise), which may not be suitable for some applications.

SUMMARY OF THE INVENTION

It is therefore an object to produce supercontinuum with low noise.

To achieve the above and other objects, the present invention uses sub-mm scale dispersion micro-management (DMM) in optical fibers, particularly short holey fibers, and in other waveguides. The generation of low noise and spectrally coherent femtosecond anti-Stokes radiation (ASR) has been experimentally demonstrated with up to 20% conversion efficiency. The DMM scheme used in the present invention is flexible in that it makes the longitudinal fiber dispersion an extra degree of design freedom, which is employed to generate ASR centered from 385 nm to 625 nm. The longitudinal variation of the phase-matching conditions for Cherenkov radiation (CR) and four-wave mixing (FWM) introduced by DMM explains the experimental results very well.

DMM is used to generate coherent and stable femtosecond visible pulses in holey fibers as short as 10 mm. DMM can also be applied to a polarization-maintained (PM) holey fiber to generate different center-wavelength visible pulses by simply changing the input polarization. With DMM flexibility, a strong f-2f beat signal for carrier-envelop phase stabilization is obtained by frequency mixing the visible pulses with the SHG of the input pulses, without frequency-doubling the red part of the octave bandwidth of the continuum.

The experimental results demonstrate the usefulness of DMM in generation of wavelength scalable, stable and spectrally coherent visible ultrashort light pulses. That versatile DMM technique can be further scaled to shorter or longer fibers and different fiber designs such as doped, multimode or others. Under the extreme conditions of continuum generation, such a strongly nonlinear system is indeed very sensitive to the detailed structure of the longitudinal profile of the fiber dispersion, and sub-mm accuracy processing of such fibers offers a new design degree of freedom.

BRIEF DESCRIPTION OF THE DRAWINGS

A preferred embodiment and variations thereof will be set forth in detail with reference to the drawings, in which.

DETAILED DESCRIPTION OF THE PREFERRED EMBODIMENT

A preferred embodiment of the present invention and variations thereon will be set forth in detail with reference to the drawings.

There are several methods to change the fiber longitudinal profiles. Exemplary methods are disclosed in United States Published patent application Ser. No. 2005/0094941 A1, published May 5, 2005, titled "Fiber device with high nonlinearity, dispersion control and gain," and in F. Lu and W. H. Knox, "Generation of a broadband continuum with high spectral coherence in tapered single-mode optical fibers," *Optics Express*, 12, 347-353 (2004), whose disclosures are hereby incorporated by reference in their entireties into the present disclosure. DMM HFs have been fabricated using the $CO_2$ laser tapering with computer control. The computer carefully controls the temperature and the pulling speed for the DMM tapering process without introducing any hole collapsing. In the preferred embodiment, as will be explained in detail below, the fiber is tapered to control the dispersion in a manner which varies along the length of the tapered portion of the fiber, thus providing the desired characteristics of the fiber.

Figure 1A:
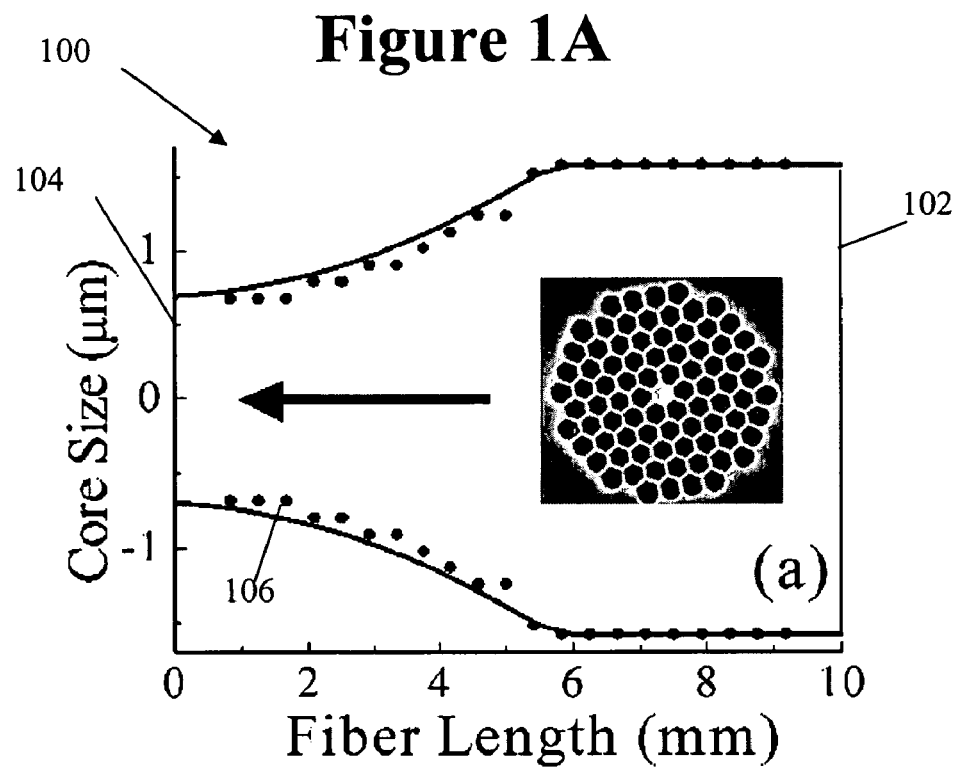
FIG. 1A shows a core diameter profile for a dispersion-micromanaged holey fiber according to the preferred embodiment.
Figure 1B:
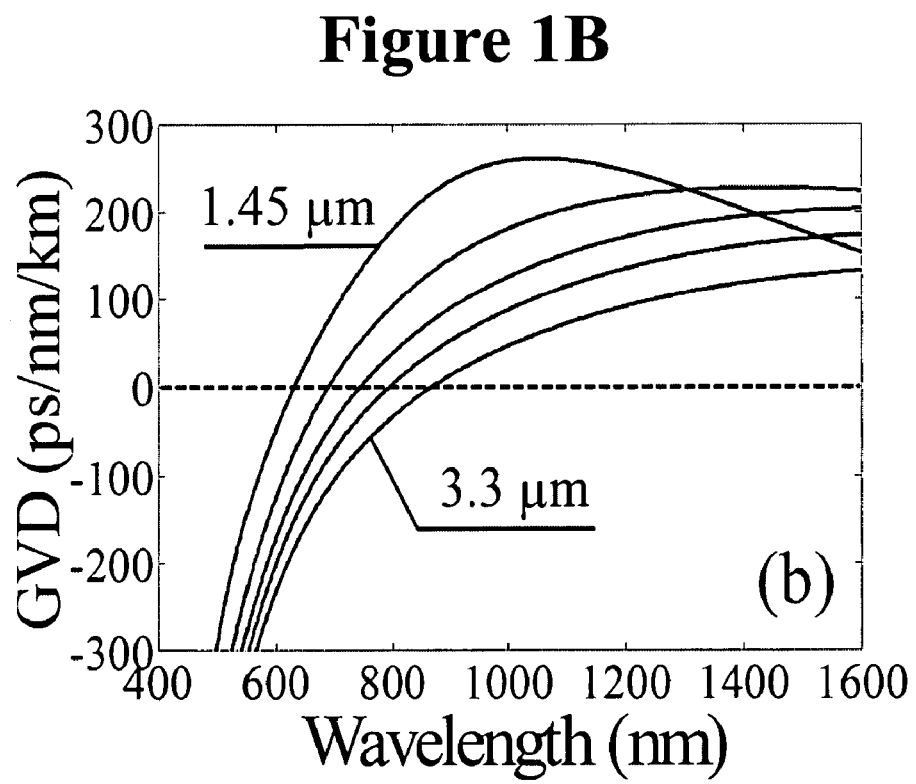
FIG. 1B shows group velocity dispersion curves for holey fiber groups with different diameters according to the preferred embodiment.
Figure 1C:
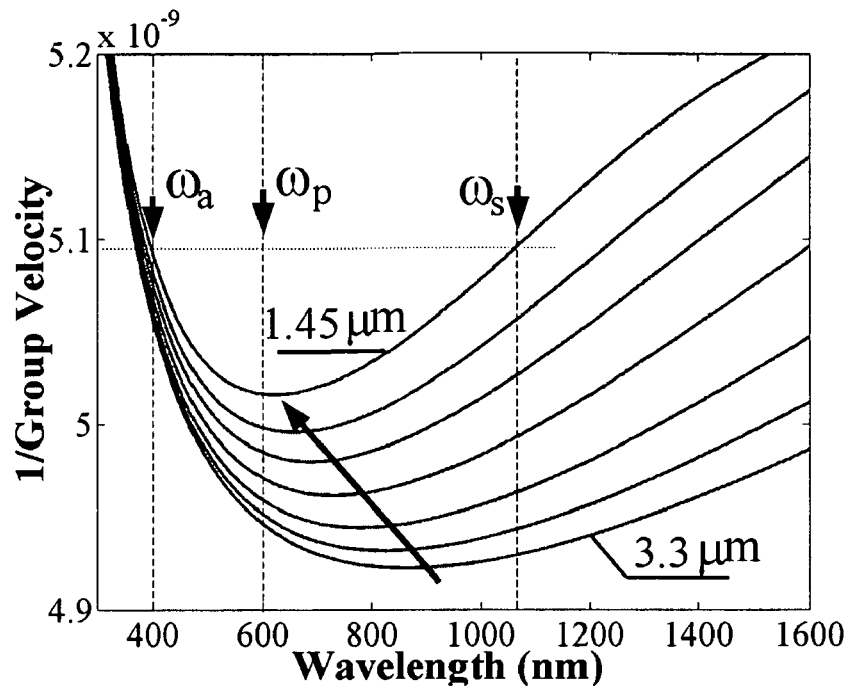
FIG. 1C shows group velocity curves for the same holey fiber groups.
Figure 1D:
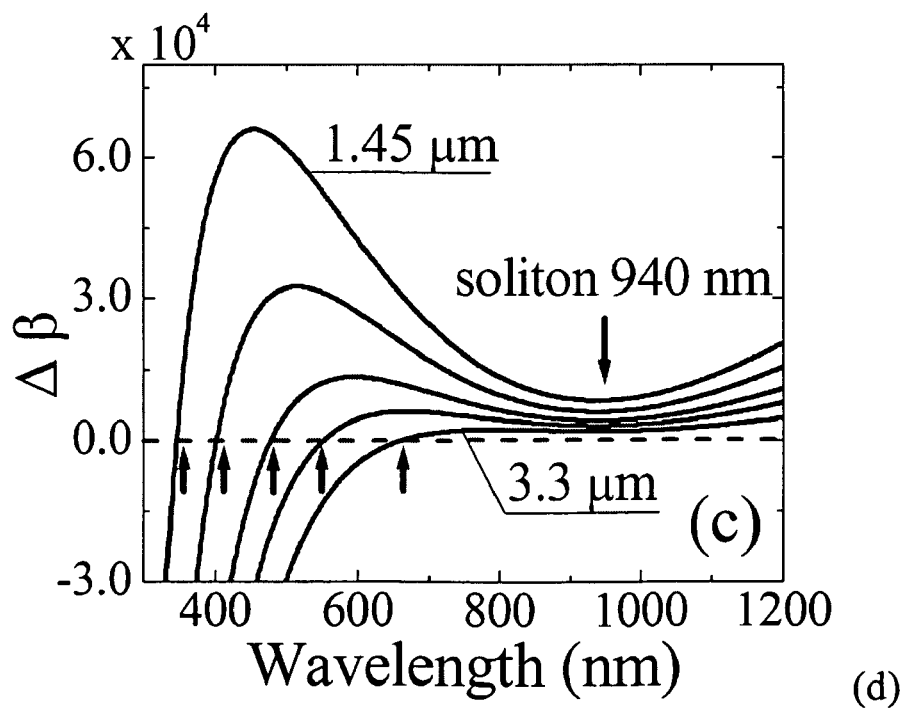
FIG. 1D shows the Cherenkov phase matching condition for different diameter holey fibers.

FIG. 1A shows the measured core diameter profile for the DMM HF 100 with 1.0 cm fiber length. The inset shows the input surface 102 for the HF. FIG. 1B shows group velocity dispersion curves for HF groups with core diameter of 3.3, 2.6, 2.2, 1.8 and 1.45 μm (from right to left). FIG. 1C shows group velocity curves for the above HF groups. For a 1.45 μm diameter HF, the wavelengths that fulfill FWM conditions are indicated with arrows, $\omega_a$: anti-Stokes; $\omega_p$: pump; $\omega_s$: Stokes. FIG. 1D shows curves of phase mismatch $\Delta\beta$ between Raman shifted soliton and CR for the above HF groups.

The inset of FIG. 1A shows a cross-section of the input end 102 of the 1.0 cm DMM fiber, with 3.3 μm and 1.45 μm core-diameters for the input surface 102 and output surface 104. It is important first to explore the property changes introduced by DMM within the 6 mm parabolically tapered section 106 in order to estimate the experimental results. Therefore, three curves are shown to explain the detailed changes. The first one is the group velocity dispersion curve, with zero-dispersion wavelength (ZDW) of the fiber shifting from 865 nm down to 630 nm (FIG. 1B). The second one is the group velocity curve, which demonstrates that the FWM condition is also moving toward the blue side as the fiber is tapered down (FIG. 1C). The third one is the resonant wavelength of the CR that is phase-matched with the Raman-shifted soliton (centered at 940 nm), and it shifts from 665 nm down to 350 nm (FIG. 1D) along the taper length. Here the CR resonant wavelength along the DMM fiber is referred to the specific wavelength that satisfies the phase-matching condition of $\Delta\beta=0$:

$$\Delta\beta = \beta(\omega) - \beta(\omega_s) - \frac{\omega - \omega_s}{v_g} - \gamma P_s \quad (1)$$

where $\beta$ is the propagation constant, $\omega_s$ and $\omega$ are the soliton and the CR frequency, respectively; $v_g$ is the soliton group velocity; $\gamma$ is the fiber's nonlinear coefficient and $P_s$ is the soliton peak power.

Those variations along the fiber length created by DMM offer a way to custom-design the continuum generation, since the propagation constant $\beta$ and $v_g$ (see FIG. 1B and FIG. 1C) in equation (1) can be manipulated to create variable resonant wavelengths in the visible region (see FIG. 1D) with a "sliding effect" along the fiber length. The "sliding effect" broadens the ASR bandwidth; at the same time, the center wavelength of the ASR can be conveniently shifted between the blue and red spectrum regions by DMM design to satisfy different application requirements. As an example, the fiber core is tapered to produce a parabolically decreasing diameter. The corresponding CR resonance condition shifts to the blue-violet side, with an enhanced FWM process (FIG. 1C) also favored for the blue-violet ASR generation.

Figure 2A:
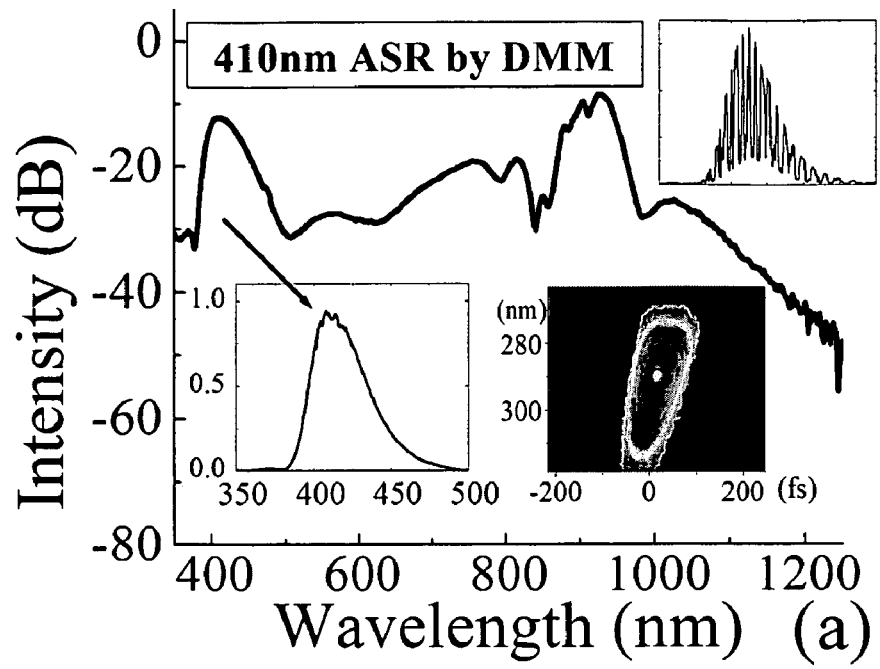
FIG. 2A shows a spectrum of the continuum generated in a fiber according to the preferred embodiment.
Figure 2B:
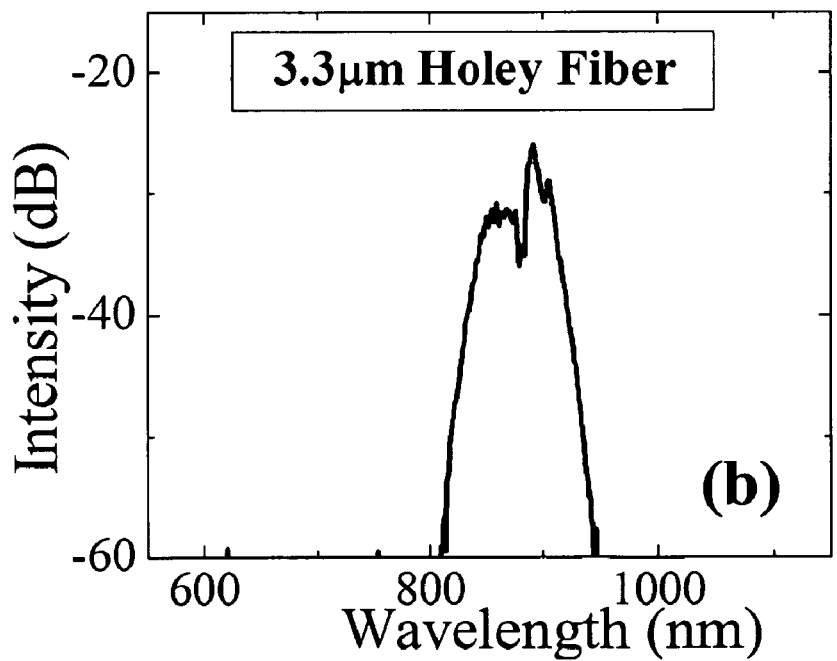
FIG. 2B shows a spectrum of the continuum generated by a dispersion-micromanaged holey fiber of constant diameter.
Figure 2C:
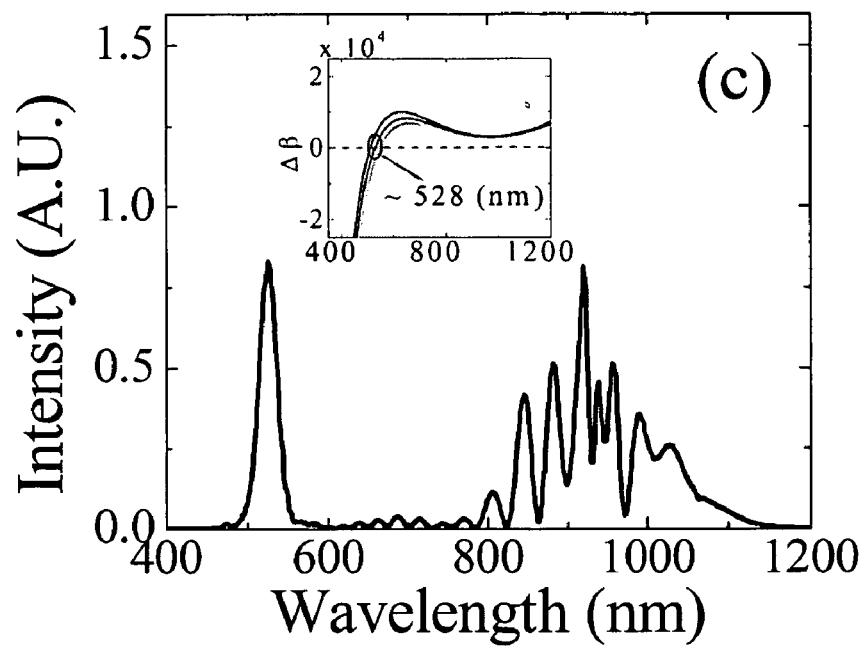
FIG. 2C shows a measured continuum spectrum for another dispersion-micromanaged holey fiber.
Figure 2D:
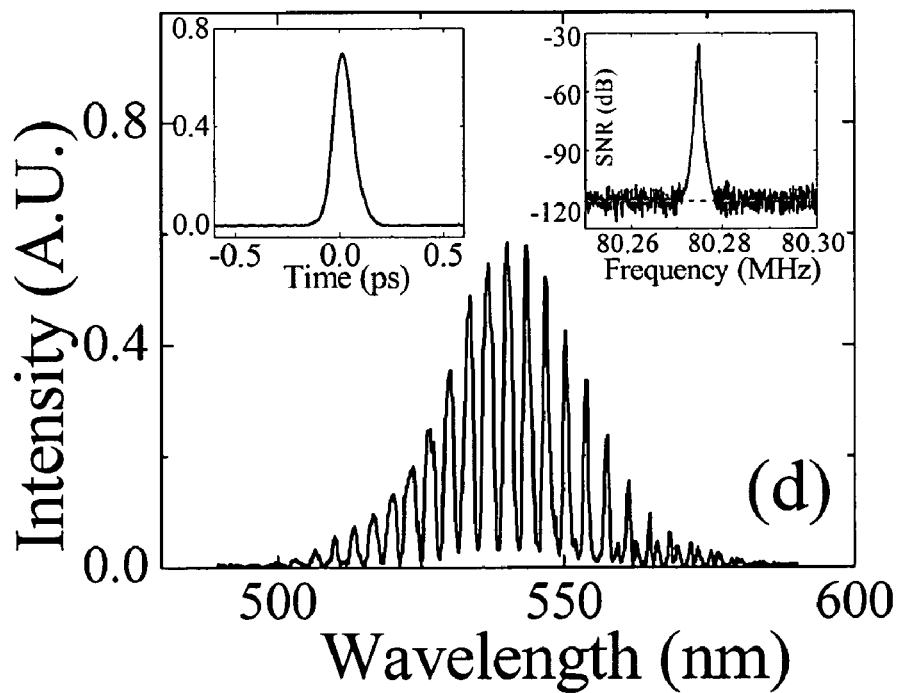
FIG. 2D shows a mutual spectral interference of a green pulse generated according to the preferred embodiment.
Figure 2E:
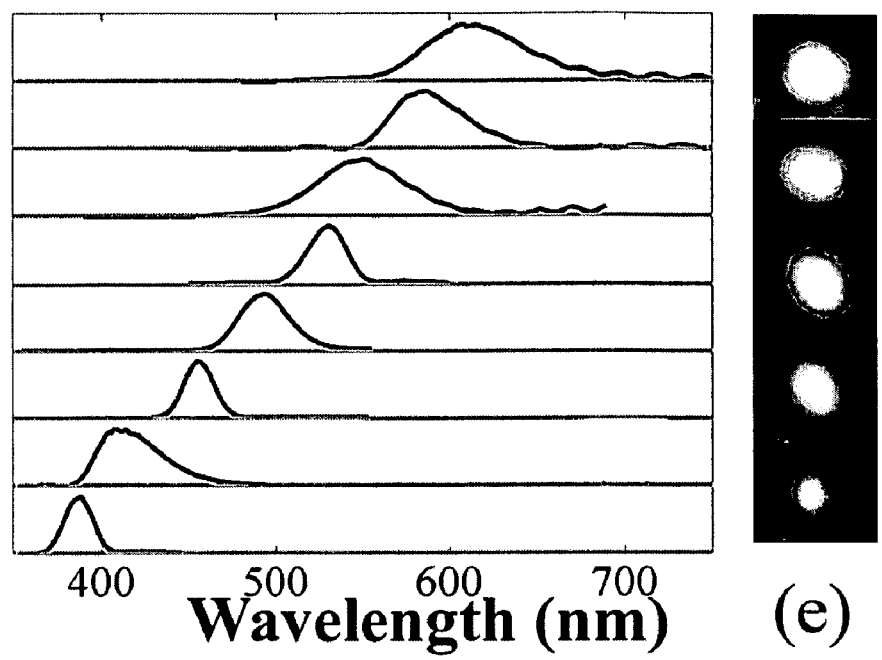
FIG. 2E shows measured spectrums of center-wavelength scalable anti-Stokes radiation (ASR) generated by different dispersion-micromanaged designs.

Experimental results will be described with reference to FIGS. 2A-2E. FIG. 2A shows the spectrum of the continuum with blue-violet ASR generated through 1.0 cm DMM HF with 880 nm $\lambda_{input}$. That figure includes the following insets: middle left: the ASR spectrum on a linear scale; middle right: XFROG trace of the ASR; upper: mutual spectral interference pattern for the ASR showing high visibility ~80%. FIG. 2B shows the spectrum of the continuum generated through 1.0 cm-long constant diameter (3.3 μm) HF with the same input condition as in FIG. 2A. FIG. 2C shows the measured continuum spectrum for the second DMM HF, showing a strong ASR centered at 538 nm with 28 nm bandwidth. The insert shows the theoretical calculation for the CR resonant wavelengths for the DMM end sections, estimating ASR centered at ~528 nm. FIG. 2D shows the mutual spectral interference measurement of the green pulse showing high coherence >90%. The figure includes the following insets: left: autocorrelation measurement showing 70 fs pulse width; right: RF measurement showing ~85dB SNR. FIG. 2E shows the measured spectra of the center-wavelength scalable ASRs from 385-625 nm generated with different DMM designs. The inset shows pictures from the output end of the DMM fibers, showing tunable ASR coverage for the visible spectrum.

After the 1.0 cm DMM HF is manufactured, 100 fs pulses from a Ti-Sapphire laser are coupled into it, and the output (fundamental mode) spectrum is analyzed with an Ando-6315 optical spectrum analyzer. With ~150 mW 880 nm coupled power, an intense blue-violet ASR feature with ~40 nm FWHM bandwidth centered at 410 nm is generated (FIG. 2A). In sharp contrast with the DMM HF, the continuum generated through the original (constant diameter) HF with 3.3 μm core of the same length shows a much narrower continuum and no blue-violet feature (FIG. 2B). Using the above analysis, that behavior can be well understood as follows. For a HF having a 3.3 μm constant core, the resonant wavelength of the CR is fixed around 665 nm (FIG. 1C) with fixed FWM bandwidth; while for DMM HF, the resonant wavelength for CR generation changes continuously down the length of the fiber at the same time with enhanced FWM toward the same blue side and with enhanced nonlinearity, leading to a resonant ASR generation with broader bandwidth located in the blue-violet region, which cannot be generated through a constant-core 3.3 μm HF.

An important property is the spectral coherence property of the ASR, which is critical for applications such as precision frequency metrology. The spectral coherence of the blue-violet 410 nm ASR has been characterized using the delayed-pulse method which was described in F. Lu and W. H. Knox, "Generation of a broadband continuum with high spectral coherence in tapered fibers," Opt. Exp. 12, 347-353 (2004) (hereby incorporated by reference). The upper inset of FIG. 2A shows the averaged interference patterns between consecutive 410 nm pulses in the pulse train. The high visibility (~0.8) proves that the ASR is generated by a deterministic process; otherwise, if the ASR is generated by some random processes, the interference fringes will be washed out due to the random phases. More specifically, the high visibility is obtained in that case because the self phase modulation (SPM) of the input soliton provides a small amount of required "coherent seed" in the resonant CR region, during the soliton fission process, CR and FWM processes can coherently amplify that blue-violet seed with high efficiency, since DMM can provide the necessary resonant conditions. The sum-frequency resolved optical gating (XFROG) technique is used to measure the time-frequency structure of our pulses. The inset in the middle right part of FIG. 2A is the XFROG trace of the blue pulse, which shows that the ASR is a well-isolated feature in both spectrum and time domains, without significant substructure in either dimension. For 150mW 880 nm $\lambda_{input}$, the ASR is measured to have 77 fs duration, and more detailed characterization is shown in F. Lu, Y. Deng, and W. H. Knox, "Generation of broadband femtosecond visible pulses in dispersion-micromanaged holey fibers," *Opt. Lett.* 30, 1566-1568 (2005) (hereby incorporated by reference).

Combining the detailed characterization of the blue-violet ASR, we are able to investigate the role of DMM in the generation of CR in more depth. The continuum generation can be well described as a high order soliton fission process (SFP). At the very beginning, the high order soliton input experiences strong compression in the time domain, and SPM resulting from the high peak power generates small seeds in the ASR region. Among them, the resonant ASR part is amplified most intensely when it overlaps in time with the Raman-shifted "pumping" soliton, which happens at the beginning phase of the SFP. For our experiment, the input power is controlled such that the fission starts near the end section of the DMM HF. As mentioned previously, as a result of the longitudinal variation of the fiber dispersion, there is a range of phase-matching conditions throughout the length of the fiber. The ASR is generated within that phase-matching range, as it experiences an "average" phase matching condition. For example, for the 1.0 cm DMM HF end section 1.9 µm-1.5 µm, it corresponds to a resonant wavelength ranges from 430 nm-350 nm; and for that DMM fiber we see the ASR emission peak centered at 410 nm with 40 nm bandwidth (FIG. 2A), an observation that fits well with the theoretical analysis.

Not only can the bandwidth of ASR be manipulated, but its center location can be manipulated as well. The DMM scheme can be designed in such a way that the broadband ultrafast visible light located at any wavelength can be generated. To confirm that flexibility, we fabricated a second DMM HF (1.8 cm) parabolically tapered down from 3.3 µm core-diameter (same as the above HF) to 2.5 µm. Using the same theoretical analysis, with 920 nm $\lambda_{input}$, the resonant ASR wavelengths (corresponding to a red-shifted 975 nm soliton during the fission phase) for the second DMM end section (from 2.7 to 2.5 µm) ranges from 545 to 510 nm, predicting an emission centered at ~528 nm (the inset in FIG. 2C).

FIG. 2C shows the experimental output spectrum generated with 85-mW coupled power. A well-isolated and strong green component is generated. The measured center wavelength of the green component is 538 nm with 28 nm FWHM bandwidth (from 553 nm-525 nm), which fits well with the above prediction (the inset in FIG. 2C). The strong green ASR contains ~20% of the total output power. An autocorrelation measurement trace for the green pulse is shown in the left inset of FIG. 2D, indicating 70 fs duration with no pulse wings.

It is important to investigate the stability and phase coherence of the green pulse. Continuum generation in conventional holey, photonic crystal or tapered single-mode long fibers without careful control is complex and can contain significant sub-structures in the time and frequency domains, leading to undesirable and unevenly distributed noise and instability for different wavelength regions. Usually, the amplitude of the continuum generated through a long HF shows large fluctuations with significant excess white-noise background, which can be revealed by a fast detector and RF spectrum analyzer (RFSA) measurement. Here, the ASR is an intense, isolated, single pulse that exhibits low noise. The green pulse (filtered with a 16 nm interference filter) is sent to the New Focus fast detector and RFSA and analyzed with a 50 kHz span width, showing no observable extra white-noise background (the right inset of FIG. 2D), and ~85 dB signal to noise ratio. Also notable is that the mutual spectral coherence measurement of the green pulse shows very high fringe contrast (>90% in FIG. 2D), indicating that a deterministic process created the green pulse. Broadband femtosecond ASR pulses generated in DMM HFs with such well-controlled properties will be useful in many applications, such as fluorescence microscopy, anti-Stokes Raman scattering (CARS) microscopy, optical coherence tomography, frequency metrology, etc.

Furthermore, a strong red pulse centered at ~600 nm with ~45 nm bandwidth is generated with a third DMM HF scheme (3.3-2.7 µm taper) under the same input conditions as the second DMM HF, which further confirms the flexibility of the DMM design. In order to demonstrate the complete coverage for ASR generation in the visible region, in FIG. 2E, we plot part of the visible ASRs that we have generated with different DMM designs even with fixed input wavelength. The figure confirms experimentally that it is feasible to generate low noise and spectrally coherent pulses centered at any visible wavelength by using different DMM design schemes. The coherent and wavelength scalable broadband ASR might provide itself as a convenient tool for many applications, especially for the coherent microscopy and spectroscopy applications.

Broadband noises can lead to large amplitude fluctuation up to 50% for the continuum generation under certain parameters. Also, relative intensity noise (RIN) is the important parameter to quantify the broadband noise effects. Here we compare the RIN for ASR generation through three methods: 1.6 cm DMM HF, 6 cm tapered fiber and 1 meter HF with constant diameter. We choose a filter centered at 535-nm with 25-nm bandwidth to filter out the ASR spectrum, and send it to the fast photo-detector and RFSA for RIN measurement.

Figure 3A:
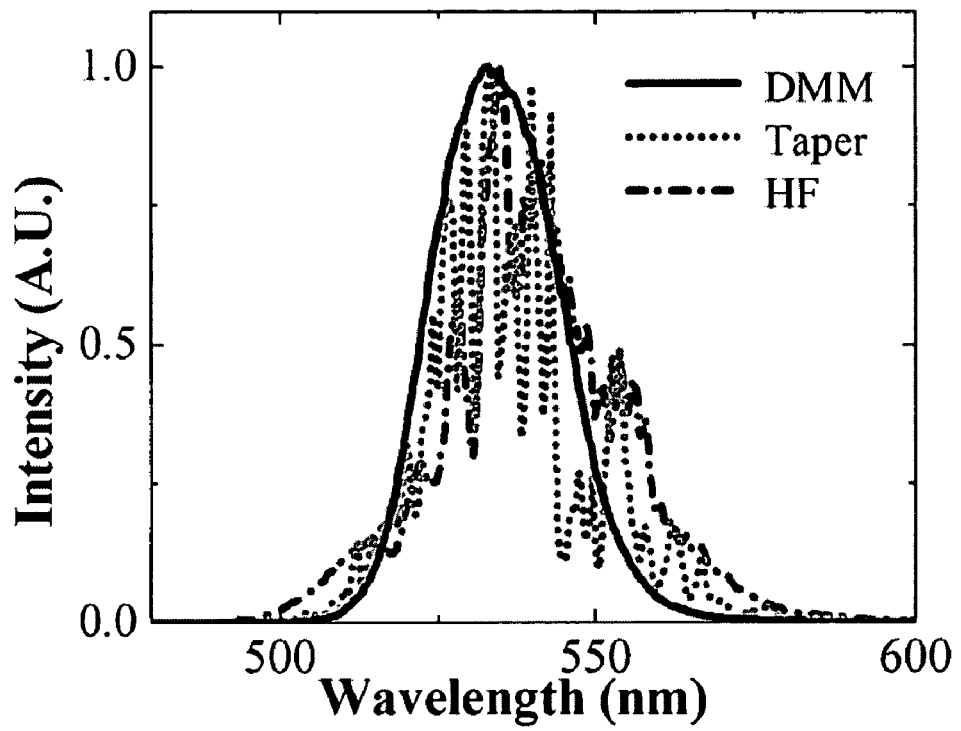
FIG. 3A shows spectra filtered out from the ASR generation through different methods.
Figure 3B:
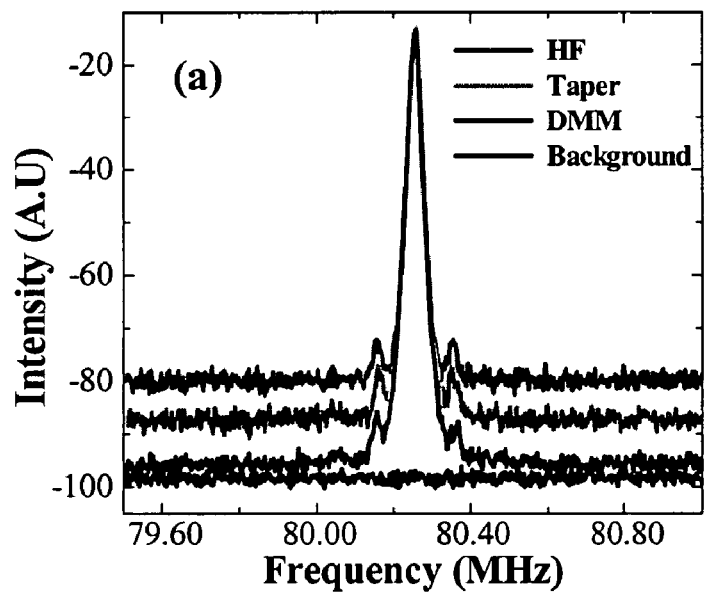
FIG. 3B shows measured RF noise backgrounds, demonstrating up to 100× lower RF noise generated by the DMM tapered source.

The results are shown in FIGS. 3A and 3B. FIG. 3A shows the spectra filtered out from the ASR generation through three types of fibers: DMM HF, tapered fiber and constant diameter HF. Filter is centered ~535 nm with 25 nm bandwidth. FIG. 3B shows the measured RF noise backgrounds for the above filtered out ASRs from three fibers. The ASR generated with DMM HF shows the lowest noise background.

FIG. 3A shows the filtered out spectrum from the three methods. The spectrum filtered out from DMM method has a well-behaved shape compared with those filtered out from the other two methods. By adjusting the attenuator before the detector, we guarantee that the filtered out spectrum has same power. They are measured to have different broadband noise levels (FIG. 3B). According to the measurement, we calculated RIN for the three methods as follows: −123 dBc/Hz, −113 dBc/Hz and −106 dBc/Hz separately. Those data show that the ASR pulses generated with DMM has the lowest RF noise and thus lower amplitude fluctuations, which is important for many applications that needs stable input power.

The ASR pulses are well behaved for the following reasons. As mentioned previously, our input power is carefully controlled so that the soliton fission process happens close to the end of the DMM fiber, so that the visible ASR is optimally shaped both in the time and frequency domains before any more "messy fission collisions" take place, and the nonlinear magnification of the broadband noise is lessened compared with the other two methods. At the same time, because of the DMM phase-matching, sliding effects and enhanced FWM for the ASR, the resultant ASR exhibit bandwidth (in the frequency domain) is up to 8 times larger than the input pulse bandwidth and power up to 20% of the total output, which is another advantage of the DMM technique.

Figure 4B:
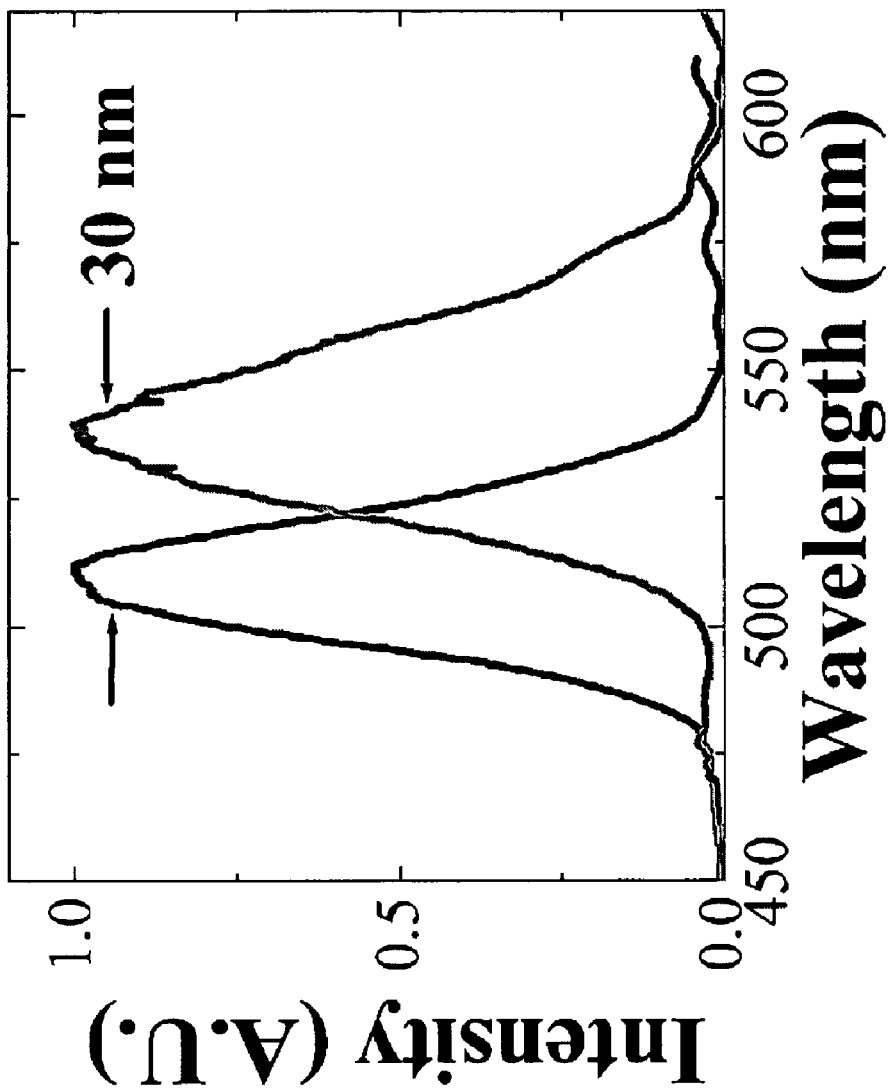
FIG. 4B shows the generation of two ASRs through the principal axes of FIG. 4A.
Figure 4A:
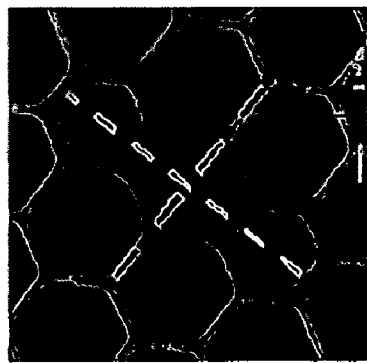
FIG. 4A shows the principal axes of a polarization-maintaining (PM) dispersion-micromanaged holey fiber

That versatile DMM technique can be scaled to shorter or longer fibers and different fiber designs such as doped, multimode, polarization-maintained (PM) or others. Here we experimentally demonstrate that by applying DMM to PM fibers, we can generate two ASRs of different colors by simply changing the input polarization (FIGS. 4A and 4B). FIG. 4A shows the cross section of a PM fiber (Crystal Fibre company) 400, which demonstrates a very asymmetric shape compared with an ordinary HF due to the highly different sizes between its two principal axes 402, 404. The mechanism behind the two-color ASR can be easily understood as follows: Since the dispersion curves of the two axes of the PM fiber are size dependent, the resonant wavelength of ASR will reflect the size difference by producing a different color ASR. Here, after the DMM process, the PM fiber still has a ~0.15 μm difference in mode diameter for the two axes; therefore, it leads to the generation of one ASR centered ~510 nm, and the other ASR centered ~540 nm, with ~30 nm difference for the center locations (FIG. 4B).

We also experimentally demonstrate one of the applications that might benefit from DMM flexibility: that is to generate an f-2f beat signal for carrier-envelope phase stabilization (CEP). The most common way to generate the beat signal is to use a very short infra-red pulse (<50 fs, in order to keep good coherence property and produce low-noise continuum) to generate an octave-spanning continuum using holey fibers; then frequency-double the red part of the continuum ($\omega$ component) and frequency-mix it with the blue part of the continuum ($2\omega$ component); finally the f-2f beat signal is obtained using a fast PMT and an RF analyzer.

Figure 5C:
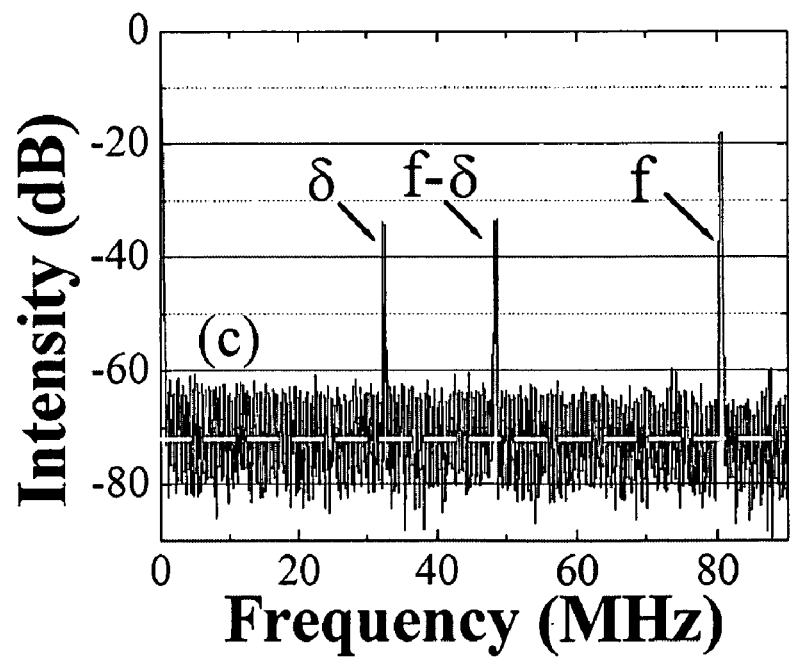
FIG. 5C shows beat signal generation between the ASR and the second harmonic.
Figure 5A:
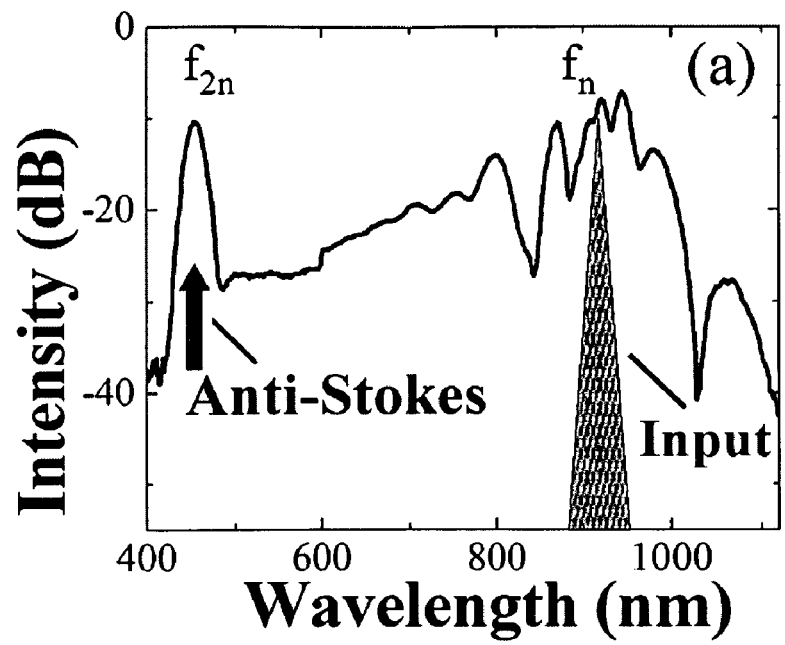
FIG. 5A shows a spectrum of the continuum generated through a dispersion-micromanaged holey fiber for f-2f beating signal generation.
Figure 5B:
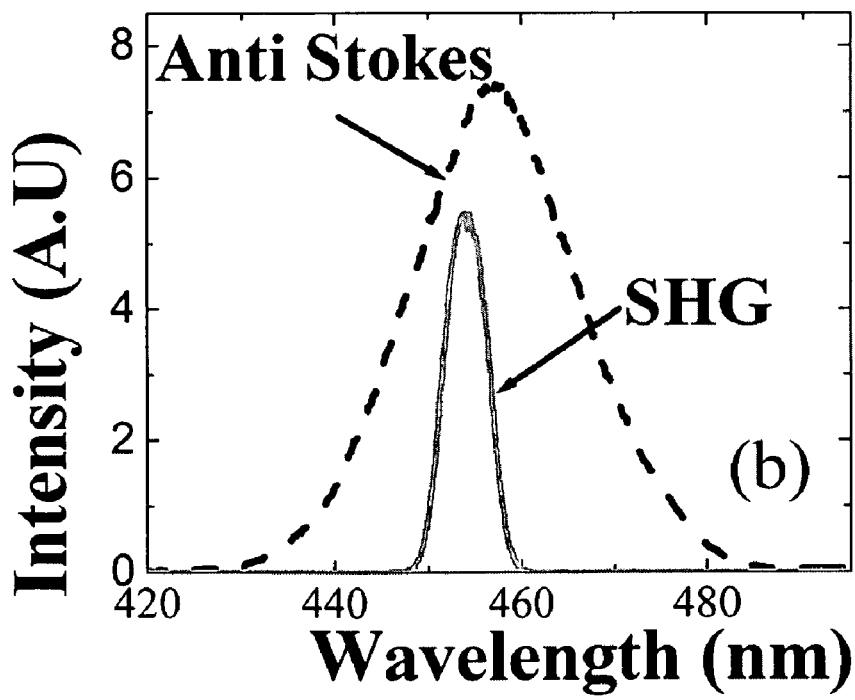
FIG. 5B shows overlapping spectra of the ASR and second harmonics of the input pulse.

With DMM flexibility, however, we can design a DMM scheme to generate an ASR with center wavelength exactly located at the second harmonic wavelength of the input pulse, and can frequency mix it with the SHG of the input pulse. FIG. 5A shows the spectrum of the continuum generated through a DMM HF that is specifically designed for the f-2f beating signal generation: with the $f_n$ component centered at the input pulse wavelength, and $f_{2n}$ component centered at the peak position of the ASR. FIG. 5B shows the exact spectrum overlapping between the ASR and the SHG of the input. The ASR is generated by a DMM HF (1.6 cm) tapered from 3.3 to 2.2 μm. Compared with the most common method, in our scheme the red part of the continuum ($\omega$ component) is replaced with the input pulse of the laser, which might help to reduce the noise background of the beat signal because of the inherent low noise property of the input laser pulse compared with the red part of the continuum ($\omega$ component). Another advantage is that the ASR intensity can be much higher than the blue part of the continuum ($2\omega$ component) that is generated without special design, therefore the beat signal might have higher intensity with higher signal to noise ratio (SNR). By making the ASR and SHG overlap in time domain and in spatial mode, we obtained beat signal with SNR 37dB above the averaged noise background line (FIG. 5C). Since we did not isolate the environmental noise in purpose and did not have active control in the setup to stabilize the laser repetition rate, the center frequency of the beat signal drifted from time to time due to the environmental noises effect. Therefore, if with further noise isolation and frequency stabilization, we might expect even higher SNR for the beat signal, which will be desirable for precision frequency metrology applications.

While a preferred embodiment and modifications thereof have been set forth in detail, those skilled in the art who have reviewed the present disclosure will readily appreciate that other embodiments are possible within the scope of the invention. For example, recitations of wavelengths and of other numerical values are illustrative rather than limiting. Therefore, the present invention should be construed as limited only by the appended claims.

We claim:

1. A method for forming an optical element for producing a broadband coherent light pulse, the method comprising:
    (a) providing a waveguide;
    (b) tapering the waveguide to form a tapered portion which has a range of resonant wavelengths for Cherenkov radiation; and
    (c) controlling step (b) such that the range of resonant wavelengths for the Cherenkov radiation varies along a length of the tapered portion.

2. The method of claim 1, wherein the waveguide comprises an optical fiber

3. The method of claim 2, wherein step (b) comprises parabolically tapering the optical fiber.

4. The method of claim 2, wherein the optical fiber provided in step (a) is a holey optical fiber.

5. The method of claim 2, wherein the optical fiber provided in step (a) is a polarization-maintaining optical fiber.

6. The method of claim 2, wherein the optical fiber provided in step (a) has a propagation constant, a soliton group velocity, and a nonlinear coefficient, and wherein step (c) comprises varying at least one of the propagation constant, the soliton group velocity and the nonlinear coefficient along the length of the tapered portion.

7. The method of claim 6, wherein step (c) comprises controlling the tapering to control a cross-sectional area of the fiber such that the nonlinear coefficient is varied along the length of the tapered portion.

8. The method of claim 2, wherein step (c) comprises selecting at least one of a desired bandwidth and a desired center location of the broadband coherent light pulse and controlling step (b) to achieve said at least one of the desired bandwidth and the desired center location.

9. A method for producing a broadband coherent light pulse, the method comprising:
    (a) providing a waveguide which has a tapered portion which has a range of resonant wavelengths for Cherenkov radiation such that the range of resonant wavelengths for the Cherenkov radiation varies along a length of the tapered portion;
    (b) providing light from a pumping light source; and
    (c) supplying the light from the pumping light source into the waveguide to produce the broadband coherent light source.

10. The method of claim 9, wherein the waveguide comprises an optical fiber.

11. The method of claim 10, wherein the tapered portion is parabolically tapered.

12. The method of claim 10, wherein the optical fiber is a holey optical fiber.

13. The method of claim 10, wherein the optical fiber is a polarization-maintaining optical fiber.

14. The method of claim 10, wherein the optical fiber has a propagation constant, a soliton group velocity, and a nonlinear coefficient, and wherein at least one of the propagation constant, the soliton group velocity, and the nonlinear coefficient varies along the length of the tapered portion.

15. The method of claim 14, wherein the tapered portion is controlled to control a cross-sectional area of the fiber such that the nonlinear coefficient is varied along the length of the tapered portion 16. The method of claim 10, wherein the pumping light in the optical fiber experiences a soliton fission process, and wherein step (b) comprises selecting a power of the pumping light such that the soliton fission process starts at a part of the tapered portion remote from the pumping light source.

17. The method of claim 10, wherein the optical fiber is tapered such that the broadband coherent light pulse has a center wavelength which is a second harmonic of the light from the pumping light source.

18. An optical element for producing a broadband coherent light pulse, the optical element comprising a waveguide which comprises:
    an input end;
    an output end; and
    a tapered portion, between the input end and the output end, which has a range of resonant wavelengths for Cherenkov radiation which varies along a length of the tapered portion.

19. The optical element of claim 18, wherein the waveguide comprises an optical fiber.

20. The optical element of claim 19, wherein the tapered portion is parabolically tapered.

21. The optical element of claim 19, wherein the optical fiber is a holey optical fiber.

22. The optical element of claim 19, wherein the optical fiber is a polarization-maintaining optical fiber.

23. The optical element of claim 19, wherein the optical fiber has a propagation constant, a soliton group velocity, and a nonlinear coefficient, and wherein at least one of the propagation constant, the soliton group velocity and the nonlinear coefficient varies along the length of the tapered portion.

24. The optical element of claim 23, wherein the tapered portion is tapered to control a cross-sectional area of the fiber such that the nonlinear coefficient is varied along the length of the tapered portion 25. A system for producing a broadband coherent light pulse, the system comprising:
    a waveguide which comprises an input end, an output end, and a tapered portion, between the input end and the output end, which has a range of resonant wavelengths for Cherenkov radiation which varies along a length of the tapered portion; and
    a pumping light source for supplying pumping light to the input end.

26. The system of claim 25, wherein the waveguide comprises an optical fiber.

27. The system of claim 26, wherein the pumping light in the optical fiber experiences a soliton fission process, and wherein a power of the pumping light is such that the soliton fission process starts at a part of the tapered portion remote from the pumping light source.

28. The system of claim 26, wherein the optical fiber is tapered such that the broadband coherent light pulse has a center wavelength which is a second harmonic of the light from the pumping light source.

29. The method of claim 1, wherein step (b) is performed with a laser.

30. The method of claim 29, wherein the laser is a $CO_2$ laser.

* * * * *